(12) United States Patent
Li et al.

(10) Patent No.: US 12,438,971 B2
(45) Date of Patent: Oct. 7, 2025

(54) ELECTRONIC DEVICE WITH A SOUND-EMITTING ASSEMBLY

(71) Applicant: VIVO MOBILE COMMUNICATION CO., LTD., Guangdong (CN)

(72) Inventors: Lele Li, Dongguan (CN); Ningjie Zheng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 249 days.

(21) Appl. No.: 18/138,048

(22) Filed: Apr. 22, 2023

(65) Prior Publication Data

US 2023/0262155 A1      Aug. 17, 2023

Related U.S. Application Data

(63) Continuation of application No. PCT/CN2021/125012, filed on Oct. 20, 2021.

(30) Foreign Application Priority Data

Oct. 23, 2020   (CN) .......................... 202011146121.9

(51) Int. Cl.
*H04M 1/03*      (2006.01)
*H04M 1/02*      (2006.01)
(Continued)

(52) U.S. Cl.
CPC .......... *H04M 1/035* (2013.01); *H04M 1/026* (2013.01); *H04M 1/0266* (2013.01);
(Continued)

(58) Field of Classification Search
CPC .... H04M 1/035; H04M 1/026; H04M 1/0266; H04M 1/0274; H04M 1/0277;
(Continued)

(56) References Cited

U.S. PATENT DOCUMENTS 5,953,414 A * 9/1999 Abraham ................ H04M 1/03
379/433.02
6,493,456 B1 * 12/2002 Hansson .............. H04R 1/2842
381/345

(Continued)

FOREIGN PATENT DOCUMENTS

CN        201435742 Y  *  3/2010
CN        203243472 U     10/2013
(Continued)

OTHER PUBLICATIONS

Extended European Search Report regarding European Patent Application No. 21882058.7, dated Apr. 3, 2024.
(Continued)

*Primary Examiner* — Allen L Parker
*Assistant Examiner* — Martin Antonio Asmat Uceda
(74) *Attorney, Agent, or Firm* — Harness, Dickey & Pierce, P.L.C.

(57) ABSTRACT

An electronic device includes a display module, a middle frame, a sound-emitting assembly, a first circuit board, a first structural member, and a back shell. The middle frame is provided with an accommodating groove. The display module is disposed in the accommodating groove. The sound-emitting assembly, the first circuit board, the first structural member, and the back shell are disposed on a side, away from the display module, of the middle frame. The sound-emitting assembly, the first circuit board, and the first structural member are located in an installation cavity formed by the back shell and the middle frame. The sound-emitting assembly includes a housing and a sound-emitting component. The housing is provided with a first cavity, and the sound-emitting component is located in the first cavity. The first structural member and the first circuit board form first space by enclosure.

6 Claims, 8 Drawing Sheets

(51) Int. Cl.
*H04R 1/02* (2006.01)
*H04R 1/28* (2006.01)

(52) U.S. Cl.
CPC ....... *H04M 1/0274* (2013.01); *H04M 1/0277* (2013.01); *H04R 1/021* (2013.01); *H04R 1/025* (2013.01); *H04R 1/2811* (2013.01); *H04R 1/2888* (2013.01); *H04R 2499/11* (2013.01)

(58) Field of Classification Search
CPC ....... H04M 1/021; H04R 1/025; H04R 1/021; H04R 1/2811; H04R 1/2888; H04R 2499/11
See application file for complete search history.

(56) References Cited

U.S. PATENT DOCUMENTS

| | | | |
|---|---|---|---|
| 7,107,016 B2* | 9/2006 | Dufosse | H04B 1/3833 343/702 |
| 7,505,602 B2* | 3/2009 | Eaton | H04M 1/035 381/345 |
| 7,578,368 B2* | 8/2009 | Yang | H04R 1/2842 379/433.02 |
| 7,711,131 B2* | 5/2010 | Furuya | H04M 1/035 381/396 |
| 8,213,659 B2* | 7/2012 | Mottonen | H04M 1/035 381/345 |
| 8,306,252 B2* | 11/2012 | Dinh | H04R 3/00 381/357 |
| 8,494,577 B2* | 7/2013 | Shiogama | H04R 1/021 455/575.8 |
| 8,913,738 B2* | 12/2014 | Qingshan | H04M 1/035 379/433.02 |
| 9,042,592 B2* | 5/2015 | Chen | H04R 1/28 381/345 |
| 9,119,001 B2* | 8/2015 | Yeh | H04R 1/2803 |
| 9,253,555 B2* | 2/2016 | Ou | H04M 1/0277 |
| 9,351,062 B2* | 5/2016 | Inoda | H04R 1/38 |
| 9,628,900 B2* | 4/2017 | Yang | H04R 9/02 |
| 9,774,933 B2* | 9/2017 | Yeh | H04R 1/023 |
| 9,961,423 B2* | 5/2018 | Jia | H04M 1/6041 |
| 10,117,018 B2* | 10/2018 | Shao | H04R 1/2842 |
| 10,194,237 B2* | 1/2019 | Liu | H04R 1/345 |
| 10,219,058 B2* | 2/2019 | Hung | H04R 1/025 |
| 10,296,057 B2* | 5/2019 | Suezawa | H05K 5/069 |
| 10,299,022 B2* | 5/2019 | Je | H04R 1/028 |
| 10,334,353 B2* | 6/2019 | Shao | H04R 1/2803 |
| 10,613,594 B2* | 4/2020 | Cheng | H04R 1/2888 |
| 10,764,689 B2* | 9/2020 | Zhang | H04R 9/06 |
| 10,979,802 B2* | 4/2021 | Chen | H04R 1/288 |
| 11,158,885 B2* | 10/2021 | Lee | G06F 3/14 |
| 11,206,477 B2 | 12/2021 | Xiao et al. | |
| 11,381,904 B2* | 7/2022 | Liao | H04R 1/44 |
| 12,193,189 B2* | 1/2025 | Masuda | H05K 7/20336 |
| 12,200,157 B2* | 1/2025 | Li | H04M 1/0202 |
| 12,212,905 B2* | 1/2025 | Park | H04M 1/03 |
| 12,302,049 B2* | 5/2025 | Woo | H04N 23/51 |
| 2005/0181841 A1* | 8/2005 | Dou | H04M 1/6016 455/90.3 |
| 2009/0190783 A1* | 7/2009 | Yang | H04R 1/28 381/337 |
| 2014/0112523 A1* | 4/2014 | Mai | H04R 1/028 381/388 |
| 2016/0173977 A1* | 6/2016 | Lim | H04R 1/04 381/334 |
| 2016/0323675 A1 | 11/2016 | Dai et al. | |
| 2018/0359343 A1* | 12/2018 | Lee | H04B 1/3888 |
| 2019/0014407 A1 | 1/2019 | Qin et al. | |
| 2021/0136189 A1* | 5/2021 | Yan | H04M 1/0266 |
| 2022/0070577 A1 | 3/2022 | Liu et al. | |
| 2022/0159369 A1 | 5/2022 | Su et al. | |
| 2022/0337689 A1 | 10/2022 | Li et al. | |
| 2022/0337940 A1* | 10/2022 | Qin | H04R 1/2857 |

FOREIGN PATENT DOCUMENTS

| | | | |
|---|---|---|---|
| CN | 204069237 U | 12/2014 | |
| CN | 204681568 U | 9/2015 | |
| CN | 204761700 U | 11/2015 | |
| CN | 205068235 U | 3/2016 | |
| CN | 205793287 U | 12/2016 | |
| CN | 106714047 A | 5/2017 | |
| CN | 206196048 U | 5/2017 | |
| CN | 107426365 A | 12/2017 | |
| CN | 109218940 A * | 1/2019 | ............... H04R 9/02 |
| CN | 209046878 U | 6/2019 | |
| CN | 110049415 A | 7/2019 | |
| CN | 108650345 B | 9/2019 | |
| CN | 110351408 A | 10/2019 | |
| CN | 210724969 U | 6/2020 | |
| CN | 210839669 U | 6/2020 | |
| CN | 210986335 U | 7/2020 | |
| CN | 111641903 A | 9/2020 | |
| CN | 112261187 A | 1/2021 | |
| EP | 2667578 A1 | 11/2013 | |
| WO | WO-2020125633 A1 | 6/2020 | |

OTHER PUBLICATIONS

First Office Action regarding Chinese Patent Application No. 202011146121.9, dated Sep. 29, 2021. Translation provided by Bohui Intellectual Property.

International Search Report and Written Opinion of the International Searching Authority regarding International Patent Application No. PCT/CN2021/125012, dated Jan. 10, 2022. Translation provided by Bohui Intellectual Property.

* cited by examiner

ELECTRONIC DEVICE WITH A SOUND-EMITTING ASSEMBLY

CROSS-REFERENCE TO RELATED APPLICATIONS

This application is a Bypass Continuation Application of PCT/CN2021/125012, filed on Oct. 20, 2021, which claims priority to Chinese Patent Application No. 202011146121.9, filed on Oct. 23, 2020, which are incorporated herein by reference in their entirety.

TECHNICAL FIELD

This application relates to the field of communication technologies, and in particular, to an electronic device.

BACKGROUND

With the rapid development of an electronic industry, functions of smart phones are becoming increasingly powerful. Stereo is a development direction of the smart phones. A stereo effect in a specific scenario can be achieved by respectively configuring speakers at the bottom and at the top of the smart phone.

SUMMARY

An embodiment of this application provides an electronic device, including: a display module, a middle frame, a sound-emitting assembly, a first circuit board, a first structural member, and a back shell.

The middle frame is provided with an accommodating groove. The display module is disposed in the accommodating groove. The sound-emitting assembly, the first circuit board, the first structural member, and the back shell are disposed on a side, away from the display module, of the middle frame. The sound-emitting assembly, the first circuit board, and the first structural member are located in an installation cavity formed by the back shell and the middle frame.

The sound-emitting assembly includes a housing and a sound-emitting component. The housing is provided with a first cavity, and the sound-emitting component is located in the first cavity and divides the first cavity into a front cavity and a rear cavity. The housing is further provided with a first sound guide hole and a second sound guide hole. The first sound guide hole communicates with the front cavity, and the second sound guide hole communicates with the rear cavity.

The first structural member and the first circuit board form first space by enclosure. Either of the first structural member or the first circuit board is provided with a third sound guide hole. The rear cavity communicates with the first space through the second sound guide hole and the third sound guide hole.

There is a first gap between the first structural member and the back shell, and there is a second gap between the housing and the back shell.

Alternatively, there is a third gap between the display module and the middle frame. The third gap forms a sound guide channel, and the sound guide channel communicates with the first sound guide hole.

Alternatively, the electronic device further includes a first sealing member. The middle frame is connected to the housing through the first sealing member in a sealing manner.

Alternatively, the electronic device further includes a second sealing member. Either of the first structural member or the first circuit board provided with the third sound guide hole is connected to the housing through the second sealing member in a sealing manner.

Alternatively, the first structural member is provided with a leakage hole. The leakage hole communicates with the first space, and a damping mesh is disposed in the leakage hole.

Alternatively, the first structural member is connected to the first circuit board through an adapter board.

Alternatively, the electronic device further includes a second structural member and a flexible printed circuit board. The second structural member is disposed between the first structural member and the back shell. A connecting component is disposed on a contact surface, in contact with the housing, of the second structural member. The sound-emitting component is electrically connected to the connecting component. The connecting component is electrically connected to the second structural member. The second structural member is electrically connected to the first circuit board through the flexible printed circuit board.

Alternatively, a connecting component is disposed on a contact surface, in contact with the first circuit board, of the housing. The sound-emitting component is electrically connected to the connecting component, and the connecting component is electrically connected to the first circuit board.

Alternatively, the housing includes a first housing part and a second housing part connected to each other. The first housing part and the second housing part are in a shape of hollow cuboids. A thickness, in a thickness direction of the display module, of the first housing part, is greater than that, in the thickness direction of the display module, of the second housing part. The first sound guide hole is disposed in the first housing part, and the second sound guide hole is disposed in the second housing part.

Alternatively, the second housing part is located between the middle frame and the first circuit board. The second sound guide hole is disposed in a contact surface, in contact with the first circuit board, of the second housing part. The third sound guide hole is disposed in the first circuit board and opposite to the second sound guide hole.

Alternatively, the second housing part is located between the back shell and the first structural member. The second sound guide hole is disposed in a contact surface, in contact with the first structural member, of the second housing part. The third sound guide hole is disposed in the first structural member and opposite to the second sound guide hole.

DESCRIPTION OF EMBODIMENTS

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art fall within the protection scope of this application.

Terms "first" and "second" in the specification and claims of this application are used to distinguish between similar objects, and do not need to be used to describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

As the functions of the smart phones are becoming increasingly powerful, an increasing number of components need to be integrated into motherboards. However, an area of a motherboard is limited. Therefore, layout space for the components is becoming increasingly limited. In a current solution for achieving the stereo, there are two solutions for placing speakers at the top. (1) A single speaker is placed. A disadvantage of this solution is as follows. Because a rear cavity is open, a battery cover vibrates violently, bringing obvious vibration sense. Accordingly, user experience is affected. (2) A speaker assembly is placed. A disadvantage of this solution is as follows. If a reserved volume for a rear cavity is excessively small, performance of the speaker assembly in a low frequency will be excessively poor and a sound effect will be poor. If the reserved volume for the rear cavity is excessively large, valuable stacking space will be occupied, and an effective layout area of the motherboard will be reduced.

With reference to the accompanying drawings, an electronic device provided in the embodiments of this application will be described in detail by using some examples and application scenarios thereof.

Figure 1:
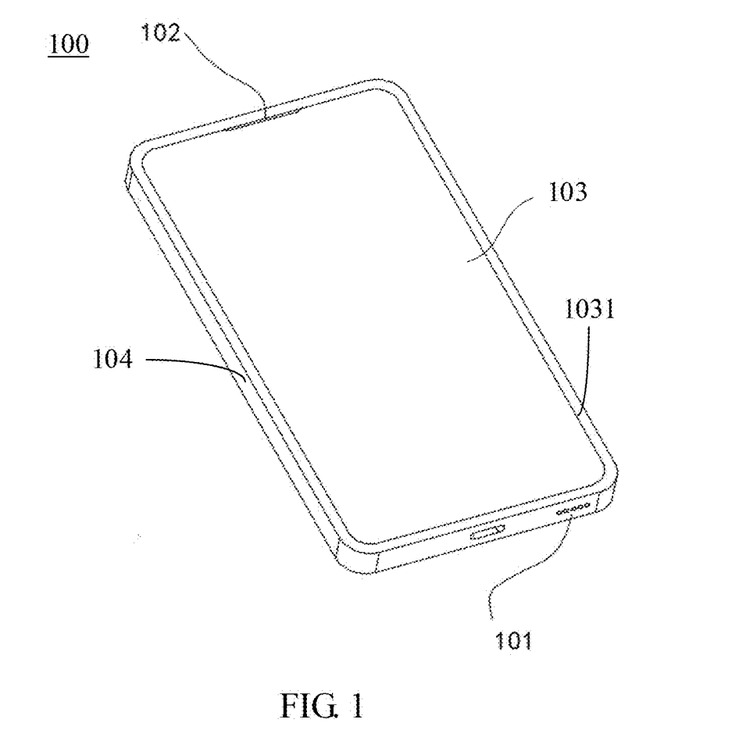
FIG. 1 is a schematic diagram of an electronic device according to an embodiment of this application.
Figure 2:
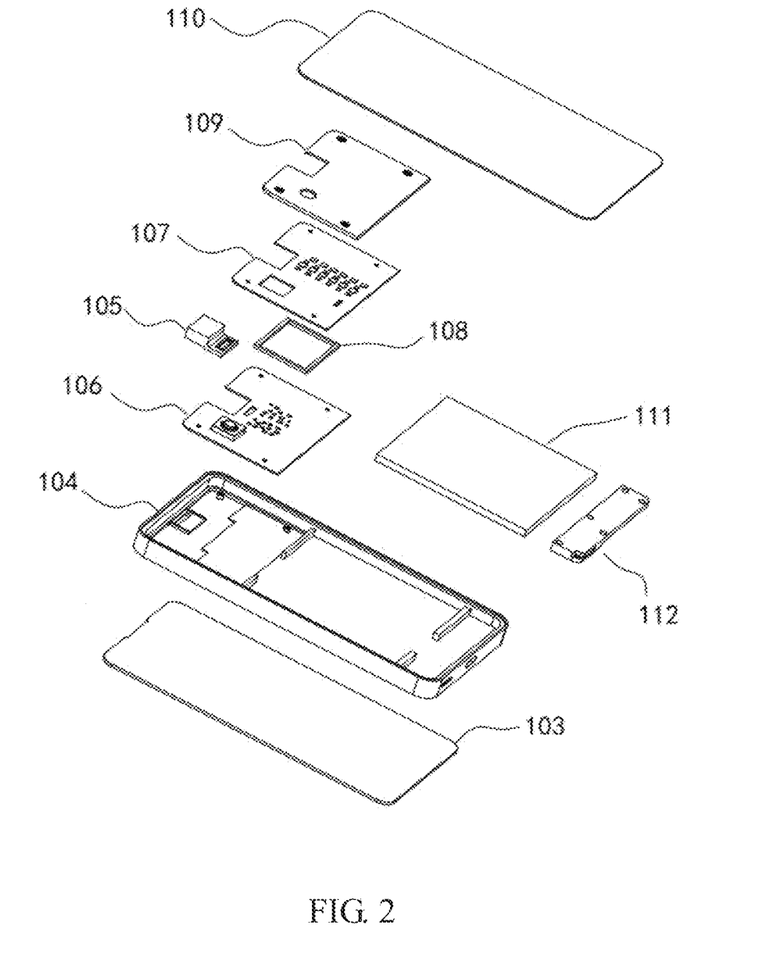
FIG. 2 is an exploded view of an electronic device according to an embodiment of this application.

FIG. 1 is a schematic diagram of an electronic device according to an embodiment of this application is provided. As shown in FIG. 1, this embodiment of this application provides an electronic device. A sound-emitting component is placed at the top of the electronic device 100. The sound-emitting component implements sound transmission on speaker through a third gap 102 of the electronic device 100. In this embodiment of this application, by using an internal component of the electronic device 100 to form a cavity with a volume as a sound cavity of a speaker assembly, so that the volume of the placed speaker assembly may be reduced. Therefore, a stereo effect can be achieved without occupying excessively space or causing vibration of a battery cover. The electronic device 100 may be a mobile phone, a tablet computer, or the like.

Figure 3:
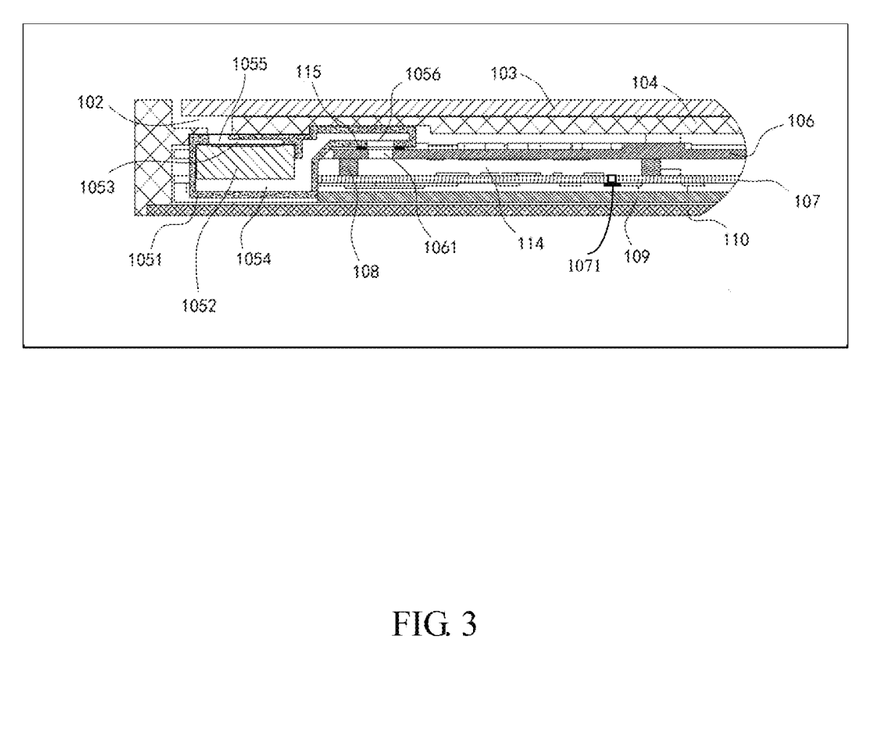
FIG. 3 is a schematic diagram of an installation position of a sound-emitting assembly according to an embodiment of this application.
Figure 4:
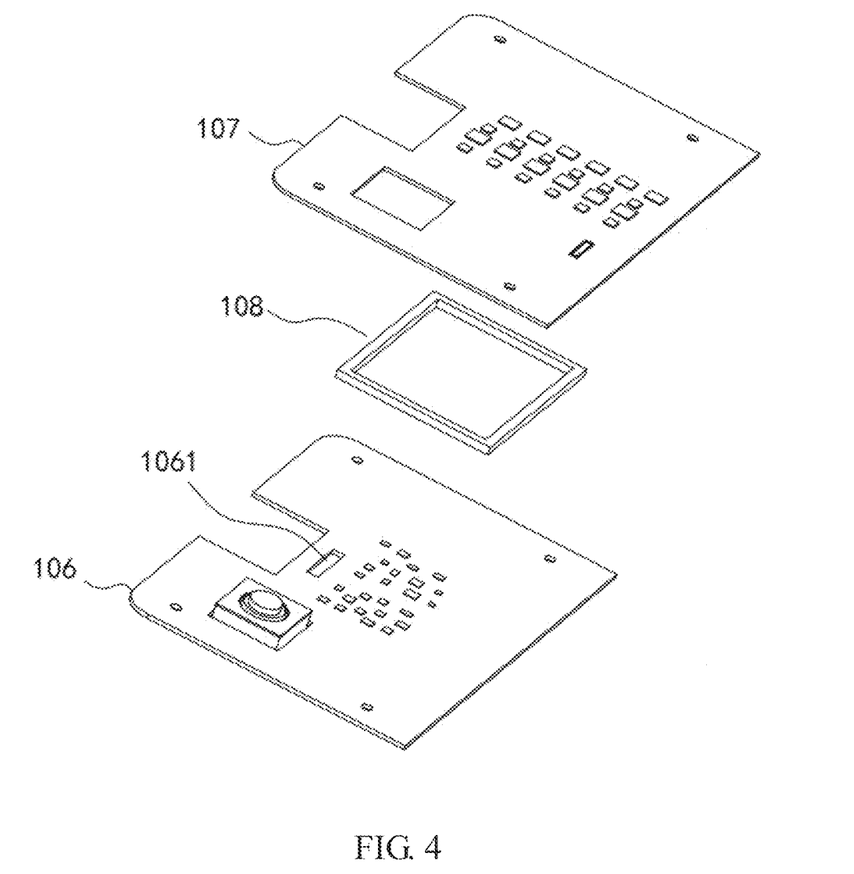
FIG. 4 is an exploded view of assemblies forming first space, according to an embodiment of this application.
Figure 5:
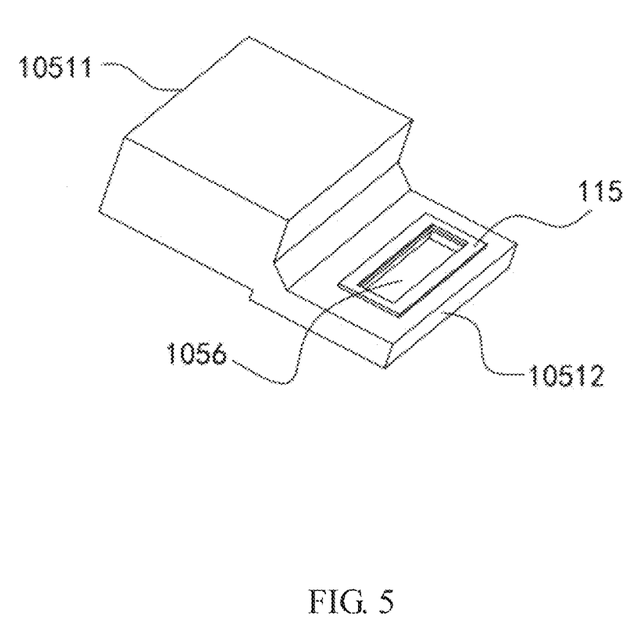
FIG. 5 is a perspective view of a sound-emitting assembly according to an embodiment of this application.
Figure 6:
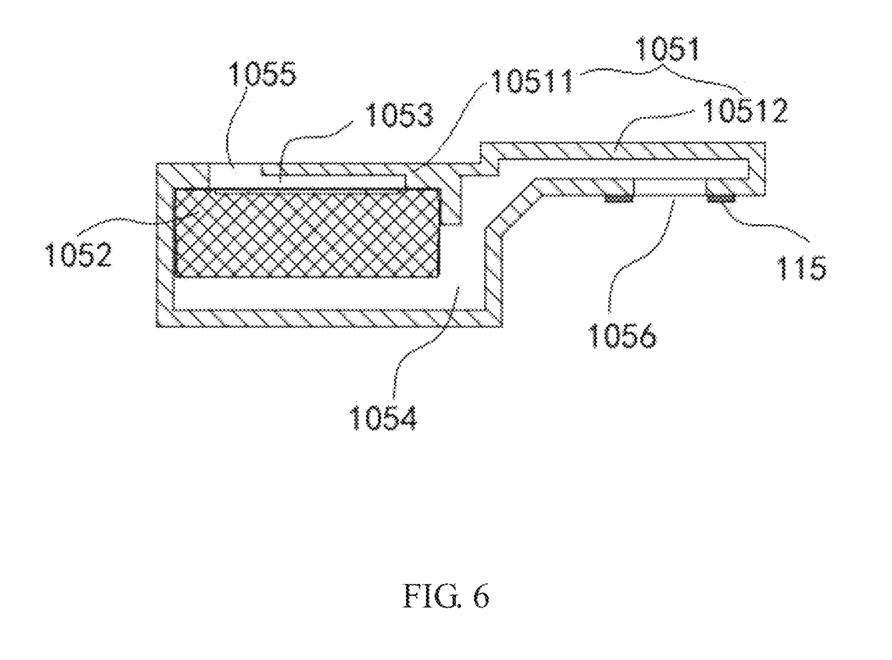
FIG. 6 is a sectional view of a sound-emitting assembly according to an embodiment of this application.

Refer to FIG. 2 to FIG. 6, FIG. 2 is an exploded view of an electronic device according to an embodiment of this application, FIG. 3 is a schematic diagram of an installation position of a sound-emitting assembly according to an embodiment of this application, FIG. 4 is an exploded view of assemblies forming first space according to an embodiment of this application, FIG. 5 is a perspective view of a sound-emitting assembly according to an embodiment of this application, and FIG. 6 is a sectional view of a sound-emitting assembly according to an embodiment of this application. As shown in FIG. 2 to FIG. 6, the electronic device 100 in the embodiments of this application may include a display module 103, a middle frame 104, a sound-emitting assembly 105, a first circuit board 106, a first structural member 107, and a back shell 110. The display module 103 is fixedly connected to a front surface of the middle frame 104. For example, an accommodating groove 1031 is disposed in the middle frame 104, and the display module 103 is disposed in the accommodating groove 1031. The sound-emitting assembly 105, the first circuit board 106, the first structural member 107, and the back shell 110 are all disposed on a side, away from the display module 103, of the middle frame 104. In addition, the back shell 110 and the middle frame 104 form an installation cavity by enclosure. The sound-emitting assembly 105, the first circuit board 106, and the first structural member 107 are all located in the installation cavity. Alternatively, the sound-emitting assembly 105 may include a housing 1051 and a sound-emitting component 1052. A first cavity is formed in the housing 1051. The sound-emitting component 1052 is located in the first cavity, and the sound-emitting component 1052 divides the first cavity into two independent cavities, namely a front cavity 1053 and a rear cavity 1054. In addition, a first sound guide hole 1055 and a second sound guide hole 1056 are further disposed in the housing 1051. The first sound guide hole 1055 is connected to the front cavity 1053, and the second sound guide hole 1056 is connected to the rear cavity 1054. To form a larger sound cavity, in the installation cavity formed by the middle frame 104 and the back shell 110, the first structural member 107 and the first circuit board 106 form first space 114 by enclosure. Either of the first structural member 107 or the first circuit 106 is provided with a third sound guide hole 1061. The rear cavity 1054 is connected to the third sound guide hole 1061 through the second sound guide hole 1056. Therefore, the rear cavity 1054 and the first space 114 form a sound cavity of the sound-emitting component 1052, to obtain a better sound effect. The third sound guide hole 1061 may be disposed in either of the first structural member 107 or the first circuit board 106, that is closer to the second sound guide hole 1056. For example, in an embodiment of this application, the first circuit board 106 is closer to the second sound guide hole 1056. Therefore, the third sound guide hole 1061 is disposed in the first circuit board 106. There is a first gap between the first structural member 107 and the back shell 110, and there is a second gap between the housing 1051 and the back shell 110. Through isolation of the first gap and the second gap, the sound-emitting component 1052 can work, without causing violent vibration of the back shell 110 and thereby affecting user experience.

In an embodiment of this application, the sound-emitting component 1052 may be a speaker, the display module 103 may include a screen, the first structural member 107 is an internal structural member of the electronic device, may be another component such as a cover plate or a circuit board, and the back shell 110 may be a structural member such as a battery cover.

Alternatively, in an embodiment of this application, there is a third gap 102 between the display module 103 and the middle frame 104, and the third gap 102 is formed as a sound guide channel. The sound guide channel is connected to the first sound guide hole 1055. Therefore, the sound-emitting component 105 can transmit sound to an outside of the electronic device 100 through the sound guide channel, thereby playing sound on speaker.

Accordingly, in the embodiments of this application, internal space of the electronic device 100 is reasonably utilized, and original components of the electronic device 100 are used to form the first space 114, so that the original rear cavity 1054 of the sound-emitting assembly 105 is connected to the first space 114. Consequently, the sound-emitting assembly 105 may be designed to be smaller, but a volume of a sound cavity of the sound-emitting assembly 105 may still be increased by using the first space 114. Therefore, performance is more excellent and a stereo effect is better, and there will be no great performance difference between a speaker at the top and a speaker at the bottom. In addition, because the first space 114 is not in contact with the back shell 110 fastened on a back of the middle frame 104, a sound wave will hardly be transmitted to the back shell 110 when the speaker works, and a problem that violent vibration of the back shell 110 will not be caused and user experience is affected will not be generated.

In an embodiment of this application, alternatively, to ensure leakproofness between the sound-emitting assembly 105 and the back of the middle frame 104, a first sealing member (not shown) is disposed between the housing 1051 of the sound-emitting assembly 105 and a press-fit surface of the middle frame 104. Therefore, under a press-fit force exerted by the sound-emitting assembly 105, the first sealing member can provide a good sealing effect. For example, the first sealing member may be a sealing ring.

In an embodiment of this application, alternatively, to ensure leakproofness between the sound-emitting assembly 105, and either of the first circuit board 106 or the first structural member 107 provided with the third sound guide hole, the electronic device 100 further includes a second sealing member 115. Either of the first circuit board 106 or the first structural member 107 provided with the third sound guide hole is connected to the housing 1051 through the second sealing member 115 in a sealing manner. Therefore, a good sealing effect can be provided by the first sealing member 115. For example, the second sealing member may also be a sealing ring.

As shown in FIG. 5 and FIG. 6, in an embodiment of this application, the housing 1051 includes a first housing part 10511 and a second housing part 10512 are connected to each other. Both the first housing part 10511 and the second housing part 10512 are hollow cuboids, and may be designed as an integral structure. A thickness, in a thickness direction of the display module 103, of the first housing part 10511, is greater than that, in the thickness direction of the display module 103, of the second housing part 10512. That is, an internal cavity of the first housing part 10511 is larger than that of the second housing part 10512. Therefore, as shown in FIG. 6, a cross-sectional shape of the housing 1051 is like a shape of a kitchen knife (that is, one vertex corner of a square or rectangle has a region extending outward), and the sound-emitting component 1052 may be disposed in the first housing part 10511. That is, the first sound guide hole 1055 is disposed in the first housing part 10511, and the second sound guide hole 1056 is disposed in the second housing part 10512. As shown in FIG. 3, in an alternative implementation, the second housing part 10512 is located between the first circuit board 106 and the middle frame 104. Because the thickness, in the thickness direction of the display module 103, of the second housing part 10512 is less than that, in the thickness direction of the display module 103, of the first housing part 10511, the first circuit board 106 and the first structural member 107 can extend to a lower region of the second housing part 10512. Therefore, a stacking thickness of an internal assembly of the electronic device 100 is reduced, helping to reduce a thickness of the whole electronic device. In this case, the second sound guide hole 1056 is disposed in a contact surface, in contact with the first circuit board 106, of the second housing part 10512, while the third sound guide hole 1061 is disposed in the first circuit board 106 and opposite to the second sound guide hole 1056, and the second sealing member 115 is disposed between the second housing part 10512 and the first circuit board 106.

In another alternative implementation, the second housing part 10512 is located between the back shell 110 and the first structural member. That is, the sound-emitting assembly 105 is turned over by 180°. In this case, only a position at which the first sound guide hole 1055 is provided is moved to a symmetrical surface. Because the thickness, in the thickness direction of the display module 103, of the second housing part 10512 is less than that, in the thickness direction of the display module 103, of the first housing part 10511, the first circuit board 106 and the first structural member 107 can extend to an upper region of the second housing part 10512. In this case, the second sound guide hole 1056 is disposed in a contact surface, in contact with the first structural member 107, of the second housing part 10512, while the third sound guide hole 1061 is disposed in the first structural member 107 and opposite to the second sound guide hole 1056, and the second sealing member 115 is disposed between the second housing part 10512 and the first structural member 107.

In an embodiment of this application, alternatively, the first structural member 107 is also provided with a leakage hole (not marked in the figure). The leakage hole is connected to the first space 114, and a damping mesh 1071 is disposed in the leakage hole. The damping mesh 1071 is attached in the leakage hole or at least one of two ends of the leakage hole. The leakage hole and the damping mesh 1071 are configured to adjust air pressure balance of the first space 114, to prevent noise caused by an excessive air pressure.

Still refer to FIG. 3, in this embodiment of this application, alternatively, the electronic device 100 further includes a second structural member 109. The second structural member 109 is disposed on a surface, away from the middle frame 104, of the first structural member 107, that is, between the first structural member 107 and the back shell 110. To implement electrical connection between the sound-emitting assembly 105 and the first circuit board 106, a connecting component is disposed on a contact surface, in contact with the housing 1051 of the sound-emitting assembly 105, on the second structural member 109. The sound-emitting assembly 105 further includes a lead wire. One end of the lead wire is electrically connected to the sound-emitting component 1052. The other end of the lead wire leads out to an outer surface of the housing 1051 and is connected to the connecting component on the second structural member 109. The connecting component is electrically connected to the second structural member 109. The second structural member 109 is electrically connected to the first circuit board 106 through a flexible printed circuit board.

Still refer to FIG. 3, in another alternative implementation, one end of the lead wire of the sound-emitting assembly 105 is electrically connected to the sound-emitting component 1052, and the other end of the lead wire leads out from the second sound guide hole 1056 connected to a rear cavity hole and connected to a connecting component on a periphery of the second sound guide hole 1056 connected to a rear cavity hole. That is, the connecting component is disposed on a surface, in contact with a motherboard, of the second housing part 10512 of the housing 1051. The other end of the lead wire is connected to the connecting component, and the first circuit board 106 is electrically connected to the connecting component. Therefore, electrical connection between the sound-emitting assembly 105 and the first circuit board 106 is implemented. Alternatively, the connecting component may be a spring plate. A pin is formed at a connection position, corresponding to the spring plate, of the first circuit board 106. Connection is implemented through press-fit contact between the spring plate and the pin.

As an increasing number of components are integrated into the first circuit board 106, but an area of the first circuit board 106 is limited, space for a component layout is increasingly limited. To resolve the foregoing problem, alternatively, in an embodiment of this application, the first structural member 107 and the first circuit board 106 are connected through an adapter board 108. Therefore, a component on the first structural member 107 is electrically connected to a component on the first circuit board 106, and an effective layout area of the first circuit board 106 is increased, so that so that more components can be placed, and more functions can be achieved.

Figure 7:
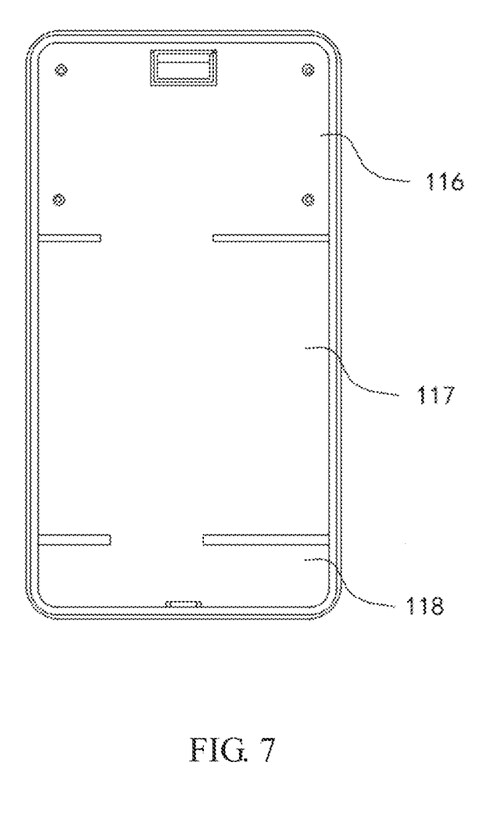
FIG. 7 is a schematic diagram of a back of a middle frame according to an embodiment of this application.

FIG. 7 is a schematic diagram of a back of a middle frame according to an embodiment of this application. As shown in FIG. 7, the back of the middle frame 104 is divided into three regions, that is, a top region 116, a middle region 117, and a bottom region 118. A speaker 105 and a cover plate assembly 106 are both disposed in the top region 116 of the middle frame 104. To achieve a stereo effect, a speaker module 112 is disposed at the bottom region 118 of an electronic device 100. The speaker module 112 implements sound transmission on speaker through a speaker sound-emitting hole 101 at the bottom of the electronic device 100. A speaker assembly occupies large space. However, because the speaker module 112 is disposed at the bottom of the electronic device 100, the large space has less influence. In this embodiment of this application, a sound-emitting assembly 105 is disposed at a top region 116. Because an original first structural member 107 and first circuit board 106 of the electronic device 100 are used to form closed first space 114, a rear cavity 1054 of the sound-emitting assembly 105 may be connected to the first space 114, thereby increasing a volume of the cavity. Therefore, a shape of the sound-emitting assembly 105 may be made smaller, so that the sound-emitting assembly 105 occupies less space at the top region 116. Further, space in the middle region 117 may be increased properly. The middle region 117 is used to place a battery 111. Therefore, a capacity of the battery 111 may be increased to some extent, thereby improving battery life of the electronic device 100. In addition, the sound-emitting assembly 105 at the top region 116 matches with the speaker module 112 at the bottom region 118 to produce a stereo effect.

Figure 8:
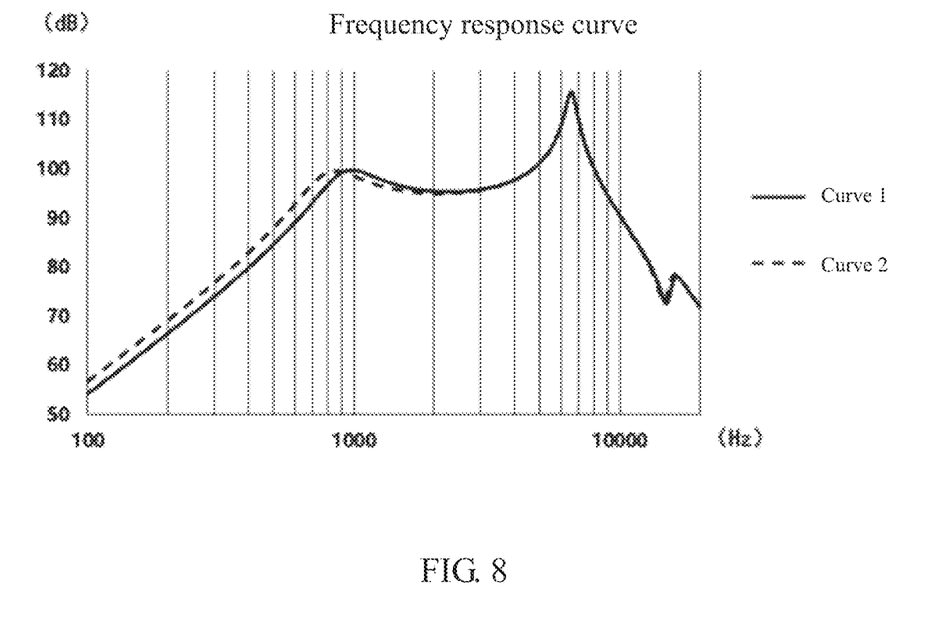
FIG. 8 is a frequency response curve graph according to an embodiment of this application.

FIG. 8 is a frequency response curve graph according to an embodiment of this application. As shown in FIG. 8, a curve 1 is a frequency response curve in the prior art, and a curve 2 is a frequency response curve after the solution in this embodiment of this application is used. It can be seen that, compared with the prior art, the solution in this embodiment of this application significantly increases a low-frequency response, that is, sound quality of an electronic device 100 is better, and user experience is improved.

In a word, in the embodiments of this application, an original frame board, a motherboard, and other components of the electronic device are used to form a closed sound cavity, reducing space occupied by a speaker and increasing a volume of the sound cavity. Therefore, performance of the speaker can be effectively increased, the sound quality can be improved, and a bad phenomenon of vibration of a battery cover caused by the speaker is prevented.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

What is claimed is:

1. An electronic device, comprising: a display module, a middle frame, a sound-emitting assembly, a first circuit board, a first structural member, and a back shell, wherein the middle frame is provided with an accommodating groove, the display module is disposed in the accommodating groove, the sound-emitting assembly, the first circuit board, the first structural member, and the back shell are disposed on a side, away from the display module, of the middle frame, and the sound-emitting assembly, the first circuit board, and the first structural member are located in an installation cavity formed by the back shell and the middle frame;

the sound-emitting assembly comprises a housing and a sound-emitting component, the housing is provided with a first cavity, the sound-emitting component is located in the first cavity and divides the first cavity into a front cavity and a rear cavity, and the housing is further provided with a first sound guide hole and a second sound guide hole, the first sound guide hole communicates with the front cavity, and the second sound guide hole communicates with the rear cavity;

the first structural member and the first circuit board enclose a first space, the first structural member is provided with a third sound guide hole, and the rear cavity communicates with the first space through the second sound guide hole and the third sound guide hole;

there is a first gap between the first structural member and the back shell, and a second gap between the housing and the back shell;

the housing comprises a first housing part and a second housing part connected to each other, the first housing part and the second housing part are in a shape of hollow cuboids, a thickness, in a thickness direction of the display module, of the first housing part, is greater than a thickness, in the thickness direction of the display module, of the second housing part, the first sound guide hole is disposed in the first housing part, and the second sound guide hole is disposed in the second housing part; and the second housing part is located between the back shell and the first structural member, the second sound guide hole is disposed in a contact surface, in contact with the first structural member, of the second housing part, and the third sound guide hole is disposed in the first structural member and opposite to the second sound guide hole.

2. The electronic device according to claim 1, wherein there is a third gap between the display module and the middle frame, the third gap forms a sound guide channel, and the sound guide channel communicates with the first sound guide hole.

3. The electronic device according to claim 2, further comprising a first sealing member, wherein the middle frame is connected to the housing through the first sealing member in a sealing manner.

4. The electronic device according to claim 1, further comprising a second sealing member, wherein the first structural member provided with the third sound guide hole communicates with the housing through the second sealing member in a sealing manner.

5. The electronic device according to claim 1, wherein the first structural member is provided with a leakage hole, the leakage hole communicates with the first space, and a damping mesh is disposed in the leakage hole.

6. The electronic device according to claim 1, wherein the first structural member is connected to the first circuit board through an adapter board.

\* \* \* \* \*